United States Patent [19]

Vaananen

[11] 4,265,396
[45] May 5, 1981

[54] CONTROL SYSTEM FOR CENTRAL HEATING

[75] Inventor: Raimo Vaananen, Tampere, Finland

[73] Assignee: Lonnstrom Oy, Rauma, Finland

[21] Appl. No.: 962,606

[22] Filed: Nov. 21, 1978

[30] Foreign Application Priority Data

Nov. 21, 1977 [FI] Finland .................................. 773511

[51] Int. Cl.³ ............................................ G05D 15/00
[52] U.S. Cl. .................................... 236/68 R; 251/11
[58] Field of Search ....................... 251/11; 236/68 R

[56] References Cited

U.S. PATENT DOCUMENTS

| | | | |
|---|---|---|---|
| 3,860,169 | 1/1975 | Norman | 251/11 X |
| 3,962,559 | 6/1976 | Drda et al. | 219/501 X |

Primary Examiner—William E. Wayner
Attorney, Agent, or Firm—Schuyler, Banner, Birch, McKie & Beckett

[57] ABSTRACT

A control system for central heating is disclosed which varies the flow rate of the heating medium as a function of remotely sensed outdoor temperature. A power transistor, which is part of the electronic control circuit, also functions as a heat source for a measuring bulb which controls the position of a flow rate control valve.

1 Claim, 1 Drawing Figure

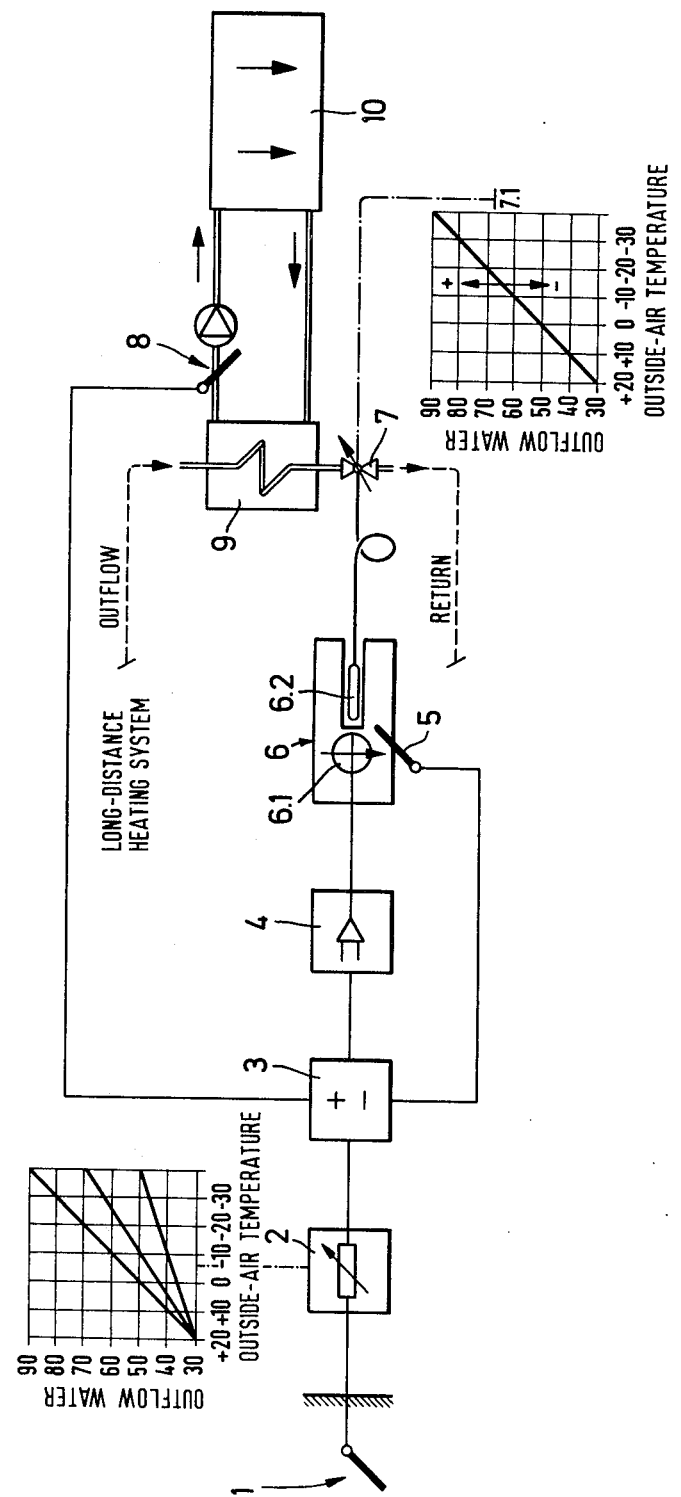

CONTROL SYSTEM FOR CENTRAL HEATING

The present invention concerns a control system for a central heating installation, comprising a heating water flow rate control valve and a sensing member or so-called measuring bulb reacting to temperature and effecting self-powered control of the control valve, an outdoor temperature pick-up, the electronic measuring signal derived from this latter having been arranged to govern the measuring bulb over a central control unit operating as electronic/self-powered converter with an incorporated measuring bulb heating unit by means of which the electronic measuring signal is transformed into a given quantity of energy heating the measuring bulb. An apparatus of this type is known in the art, for instance, through the German publicizing print No. 1 171 137. The said apparatus features the combination of two different kinds of control system: a so-called self-powered control system and an electronic control system. In the self-powered control system the measuring bulb is disposed to measure directly the temperature of the outgoing water, and the self-powered feature is understood to mean that the measuring bulb communicates by a capillary tube with the control valve in such manner that the changes in the vapour pressure of the liquid or vapour within the measuring bulb, caused by temperature changes, directly produce through the capillary tube the self-powered control of the valve. The sole weak point of this simple, reliable and efficient control system is that the distance between the point of control and the point of measurement is limited. Owing to this reason, the self-powered control is not suitable to be used for instance in heating systems utilizing heat supplied by a remote area heating system, where at is a requirement that the guiding value for control is derived from the outdoor temperature.

It is known in the art, in control based on the outdoor temperature, to employ an electronic outdoor temperature measuring pick-up, the electrical measuring signal obtained from the latter controlling the control valve by means of a servomotor. The drawback of this system is the need of an expensive servo control motor; in addition this arrangement uses linkages requiring maintenance and subject to wear, and the noise of the running servomotor is objectionable.

In a control system of this type known in the prior art these drawbacks have been avoided and the advantages of self-powered control and of electronic control have been combined. However, this control system of the prior art suffers under the drawbacks of inaccuracy and poor reliability because no supervision of the measuring bulb heating power and of the valve position thereby produced has been provided.

The object of the present invention is to develop further the control system of the type mentioned, so as to obtain a more reliable and more accurate control by a simpler apparatus design.

This aim is achieved in the invention by using as heating unit for the measuring bulb, in the central control unit, a power transistor and by measuring the position of the control valve as a function of the temperature of the power transistor and adding this signal as feedback to the electronic measuring signal of the mentioned outdoor temperature. By using in the control circuit for the measuring bulb heating power a power transistor, which at the same time supplies the requisite heating power, one achieves a remarkable simplification of the construction, compared with the practice of using heating resistances which are separate from the heating power control circuit. The arrangement taught by the invention also affords substantial functional advantages over the aforementioned system of prior art. The system of the invention automatically regulates the heating power of the measuring bulb for correcting the actual value of the valve to agree as closely as possible with the set-point value. A special extra advantage is gained by means of the invention owing to the fact that the feedback measurement serves, at the same time, as excessive heating protection for the transistor, for which the maximum temperature is +150° C., for instance. It is thus understood that the design taught by the present invention implies a substantial improvement of reliability and measuring accuracy with a simpler apparatus design.

The invention shall be illustrated in the following with reference to the attached drawing, which presents the principle block diagram of the control system of the invention.

The valve 7 controls the flow of heating fluid from the area heating network through the heat exchanger 9, to which the heating radiators 10 of the flats have been connected.

The electronic sensing means 1 measures the outdoor temperature and governs over the control characteristic correction unit 2 the set-point value for the adding unit 3. The measuring signal obtained from the measurement 8 of the water going out to the radiators 10 is added to the set-point value in the adding unit 3. It is possible by means of this feedback to check the set-point and to adjust it to be better consistent with a predetermined outgoing water temperature dependence, independent of the other conditions and factors of variation in the heating system. The sum datum obtained from the adding unit 3 governs over the amplifier 4 the bulb heating unit 6 in such manner that one achieves an outgoing water temperature depending on the outdoor temperature in desired manner. The heating of the measuring bulb 6.2 is with the aid of the power transistor 6.1, which directly heats the measuring bulb 6.2 of the self-powered valve 7.

As taught by the invention, the electric sensing member 5 measures the temperature of the bulb 6.2 and/or the power transistor 6.1, which at the same time indicates the position of the valve 7. This measuring signal indicating the temperature in the measuring bulb heating and the position of the control valve has been connected as feedback to the adding unit 3, where it is added to the electronic measuring signal of the outdoor temperature. Owing to this feature, the reliability in use and accuracy of the control system could be substantially increased. The power transistor 6.1 may fulfill two functions simultaneously: operating both as an active component in the control circuit and as heating component.

The control mode presented is proportional (P) control, wherein the relative position of the control valve 7 is measured as a function of the measuring bulb temperature.

If required, the measuring bulb 6.2 of the self-powered control valve 7 may be detached from the electrical system, whereby it may operate merely as a self-powered standard control system. This implies an advantage for instance in the case of damage of the electronic system, in that the self-powered measuring bulb may then be transferred to measure the outgoing water, whereby the control will function, maintaining the outgoing water constant at the set value.

I claim:

1. A control system for central heating comprising:
a heating medium flow rate control valve;
a temperature responsive measuring bulb operatively connected to said control valve by a capillary tube for effecting self-powered control of valve position as a function of bulb temperature;
an outdoor temperature sensor for producing a feedback signal representative of outdoor temperature;
a bulb temperature sensor for producing a feedback signal representative of valve position;
electronic central control means having bulb heating means, including a power transistor as an active component in the circuitry of the central control means and as a heat source, said heating means detachably holding said bulb, said bulb and capillary tube being so constructed so that said bulb can be removed from said heating means and repositioned to measure the temperature of the heating medium downstream of said valve and control said valve independently of said control means
said central control means being operatively connected to said outdoor temperature sensor and to said bulb temperature sensor to accurately power said bulb heating means responsive to said outdoor temperature signal and said valve position feedback signal when said bulb is positioned in said bulb heating means.

* * * * *